No. 714,566. Patented Nov. 25, 1902.
E. D. EASTMAN.
SPRINKLER HEAD FOR WATERING CARTS.
(Application filed July 9, 1902.)
(No Model.)
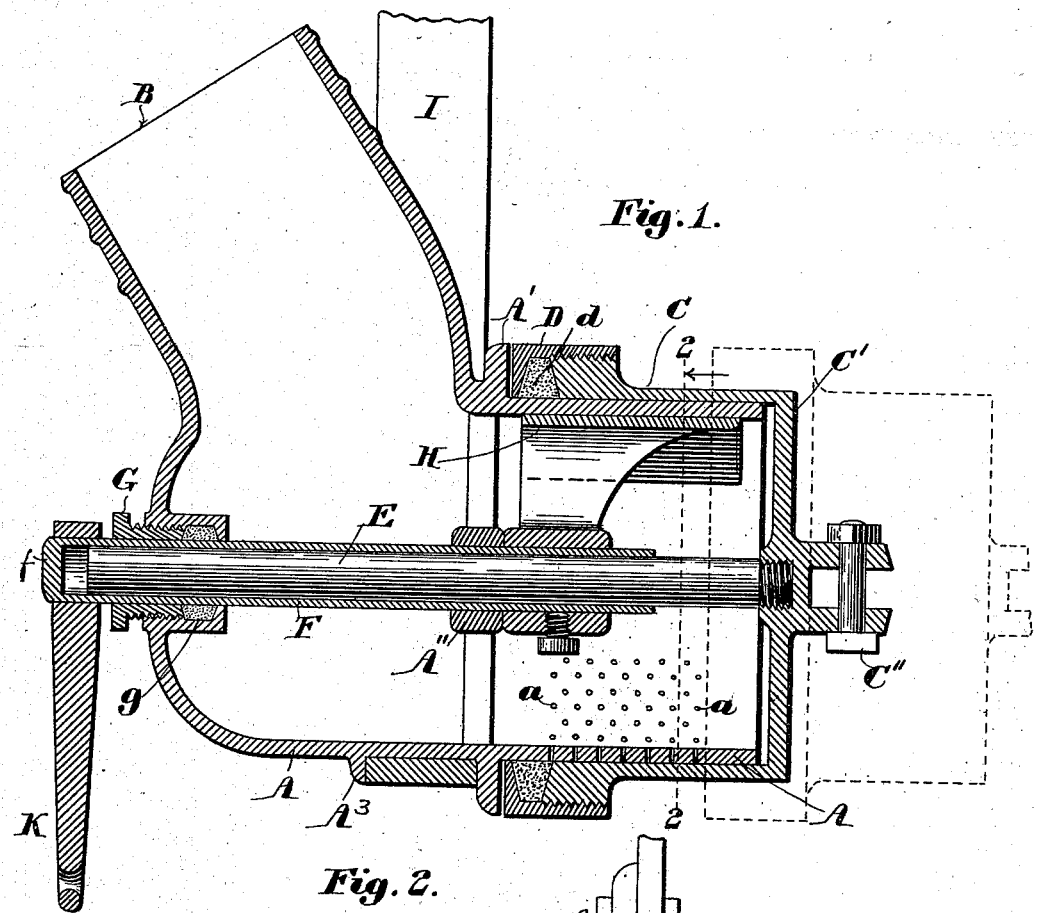
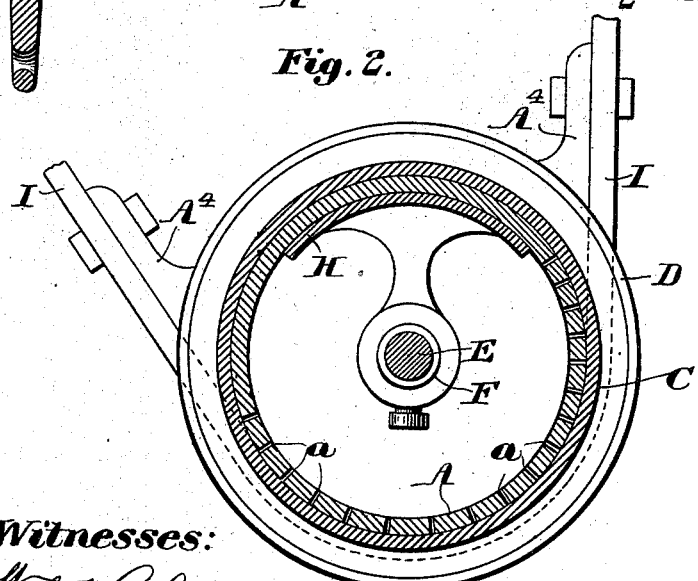
Witnesses:
Walter C. Lombard
Nathan C. Lombard 2nd
Inventor:
Edgar D. Eastman
by Wm. Andrew Atty.

UNITED STATES PATENT OFFICE.

EDGAR D. EASTMAN, OF CONCORD, NEW HAMPSHIRE.

SPRINKLER-HEAD FOR WATERING-CARTS.

SPECIFICATION forming part of Letters Patent No. 714,566, dated November 25, 1902.

Application filed July 9, 1902. Serial No. 114,877. (No model.)

*To all whom it may concern:*

Be it known that I, EDGAR D. EASTMAN, a citizen of the United States, and a resident of Concord, in the county of Merrimack and State of New Hampshire, have invented certain new and useful Improvements in Sprinkler-Heads for Watering-Carts, of which the following is a specification.

This invention relates to improvements in sprinkler-heads for watering-carts; and it is carried out as follows, reference being had to the accompanying drawings, wherein—

Figure 1 is a central longitudinal section of the improved sprinkler-head, and Fig. 2 is a cross-section on the line 2 2 shown in Fig. 1.

Similar letters refer to similar parts wherever they occur on the different parts of the drawings.

In the drawings, A represents the stationary cylindrical main shell, provided with spray-perforations $a\, a$, as shown. Preferably integral with said perforated main shell is made the supply branch B, adapted to be connected to the tank of the watering-cart by means of a flexible hose or other suitable connecting device.

C is the cylindrical main valve-shell or cut-off, which fits around the shell A and is longitudinally movable thereon, so as to close the spray-openings $a\, a$ or to expose the same wholly or in part, as may be desired, during the sprinkling operation. The said cylindrical valve or cut-off has a solid closed outer end C', to the outside of which is preferably secured a bolt C'', to which may be connected a lever or other suitable device for adjusting the position of the valve or cut-off C. The said valve may be operated from the foot-board of the cart or otherwise, as may be most practical and convenient, and need not here be described in detail. For the purpose of making a water-tight connection between the said cylinder-valve C and sprinkler-shell A, I provide the inner open end of said valve with a stuffing-box D and packing-ring $d$, as shown in Fig. 1, by which arrangement all leakage is prevented when said valve is closed.

A' is a flange on the shell A, which may serve as a means for limiting the closing movement of the valve C, as shown in Fig. 1.

E is a centrally arranged valve-spindle secured to the solid valve end C', and said spindle is guided and longitudinally adjustable in a sleeve F, centrally arranged within the shell A. The said sleeve F is journaled at its inner end in a bearing A'', attached to or made integral with the shell A, and the outer end of such sleeve projects through a stuffing-box G, arranged at the inner end of the sleeve A and provided with a packing $g$, so as to establish a water-tight connection between said sleeve and shell, thus preventing leakage at such place. The outer end of said sleeve F is closed at $f$, as shown in Fig. 1, thus preventing leakage through said sleeve. To the inner end of said sleeve F is secured a segmental deflector-blade H, the outer curved portion of which fits within the interior of the main shell A and may be turned so as to cover such of the spray-perforations $a\, a$, that are on the outer side portion of the shell A, as may be desired in passing a team, person, &c., without ejecting water on such team, person, or other object and without shutting off the entire flow from the sprinkler-head.

The deflector-blade H, being attached to the sleeve F, may be oscillated within the shell A by actuating a lever K, attached to the outer end of said sleeve F, as shown in Fig. 1.

In practice I make on the outside of the shell A a flange or rib $A^3$, between which and the flange A' is placed the strap or hanger I, which passes partially around the exterior of the shell A and may be secured to ears on the exterior of said shell, as shown. The upper ends of said strap or hanger may be secured to the framework of the sprinkler-cart as may be most practical and convenient.

From the above it will be seen that by longitudinally adjusting the position of the cylindrical valve more or less of the spray-openings $a\, a$ may be exposed for regulating the sprinkling operation or entirely closed when so desired, and by adjusting the position of the deflector-plate H the flow of the water in a horizontal, or nearly so, direction can be stopped whenever so desired, as above stated.

Among the advantages of this my invention may be mentioned: The valve-shell C is entirely closed by the solid diaphragm C' at its outer end, whereby leakage is prevented at such part. By providing the inner end of said valve-shell with a stuffing-box and stuffing all leakage is prevented between the cylindrical surfaces of the shell A and valve-shell C. The said valve C is attached to a spindle E, arranged, concealed, and protected entirely within the shell A, and is guided in a deflector-blade-actuating sleeve, also concealed and protected within the said shell A. As such spindle and sleeve are not exposed during the longitudinal adjustment of the valve, they are not liable to injury, breakage, or defacement by coming in contact with passing objects or obstacles on the road.

In my device the deflector-blade H is attached to a sleeve F, that is not longitudinally adjustable and projects but slightly beyond the inner end of the shell A and is thus protected from injury on account of such location, as is also the deflector-blade lever K, which is also arranged at the inner or back end of the shell A. This is a decided advantage over devices in which the exposed ends of a sleeve and spindle project outside of the adjustable valve-shell. By providing the bearing of the rocking sleeve F with a stuffing-box G all leakage and dripping at this place is prevented.

An important advantage resulting from my improved construction consists in the fact that when the jet-openings $a$ are closed they are covered and protected against the lodgment therein of dust, dirt, grit, and the like, and the same is true of the sleeve and spindle E. When the openings $a$ are open, the water keeps them free. This is also true of the deflector-plate H, which, being arranged on the interior of the shell A, will freely work at all times, there being no opportunity of the grit getting between said deflector-plate and shell, as there would be if the deflector-plate was arranged externally of the shell. Moreover, if the deflector-plate was arranged externally of the shell the tendency of the pressure of the water would be to force said plate from its seat, while by arranging the deflector-plate on the interior of the shell the pressure of the water has a tendency to hold it to its seat.

What I wish to secure by Letters Patent and claim is—

In a sprinkler-head, the combination with a cylindrical spray-shell A open at its outer end and provided near said end with a plurality of perforations, a longitudinally-adjustable cylindrical valve closed at its outer end and fitted over the outer end of said shell, a sleeve centrally journaled in said shell and projecting through the inner end of the latter, a spindle fixed at one end centrally to the closed end of said cylindrical valve and arranged to be reciprocated in the sleeve, a segmental deflector-plate rigidly connected to the sleeve and movably arranged in contact with the interior of the shell, and means for rocking the sleeve to adjust the deflector-plate, substantially as described.

In testimony whereof I have affixed my signature in presence of two witnesses.

EDGAR D. EASTMAN.

Witnesses:
ALBAN ANDRÉN,
MARY B. WILSON.